Figure 1:
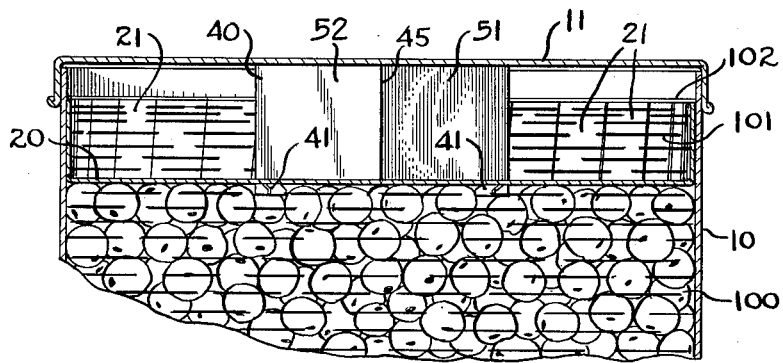

June 5, 1962   D. H. MORISETTE   3,037,653
FOOD PACKAGE

Filed Nov. 16, 1960   2 Sheets-Sheet 1

INVENTOR.
DOUGLAS H. MORISETTE
BY
ATTORNEYS

June 5, 1962 D. H. MORISETTE 3,037,653
FOOD PACKAGE
Filed Nov. 16, 1960 2 Sheets-Sheet 2

INVENTOR.
DOUGLAS H. MORISETTE
ATTORNEYS

United States Patent Office 3,037,653
Patented June 5, 1962

3,037,653
FOOD PACKAGE
Douglas H. Morisette, Palo Alto, Calif., assignor to American Can Company, New York, N.Y., a corporation of New Jersey
Filed Nov. 16, 1960, Ser. No. 69,711
3 Claims. (Cl. 215—81)

This invention relates to a bulk package for foods packed in a liquid medium. The invention is particularly useful in the packaging of fruits which are packed in a liquid medium, to be subsequently frozen for preservation.

In the bulk packing of fruit or other food in a liquid medium, for example cherries in a sugar syrup, the cherries are first placed in the container and the syrup then is poured over the fruit. The cherries tend to float above the level of the syrup, where they are exposed to the air and consequently subject to desiccation or "browning" during freezing and storage.

This exposure of the fruit to the air above the syrup is increased from another action which occurs during the freezing operation. The fruit and syrup toward the outside of the container tend to freeze first, and as the frozen portion naturally expands, increasing its volume, the unfrozen center portion is forced above the surface of the syrup, additionally exposing a part of the fruit to the air and consequent desiccation. This problem is serious from the standpoint of waste.

In the past circles or dividers have been used to hold the fruit down below the surface of the packing medium. Such means have been satisfactory to keep the fruit submerged around the perimeter of the container, but not in the center due to the lack of support between the divider or fruit circle and the top of the container. In order to provide such center support, an inverted paper cup with air-vent holes in the bottom has been placed between the top of the container and the divider to hold the fruit circle or divider down at the center and thus to keep the fruit immersed below the surface of the syrup. This method is uneconomical due to the cost of the cup, and unsatisfactory because of the tendency of the cup to either shift its position to one side or tip over.

Further, in this method there is a problem of splashing of the liquid medium when the container is filled with the fruit circle or divider in place. This reduces the speed with which the container can be filled. Consequently, it has long been desired to develop a food depressor which would hold down the fruit throughout the liquid surface and at the same time permit rapid filling of the container with relatively little splashing.

The principal object of the present invention is to provide an improved package for perishable foods which prevents desiccation of the foods by providing a centrally located, connectively attached spacer on a divider which maintains the foods at a level below that of the liquid packing medium.

It is a further object of the present invention to provide a food package having a spacer and divider suitable for fast non-splash filling of the container with the liquid packing medium.

Figure 4:
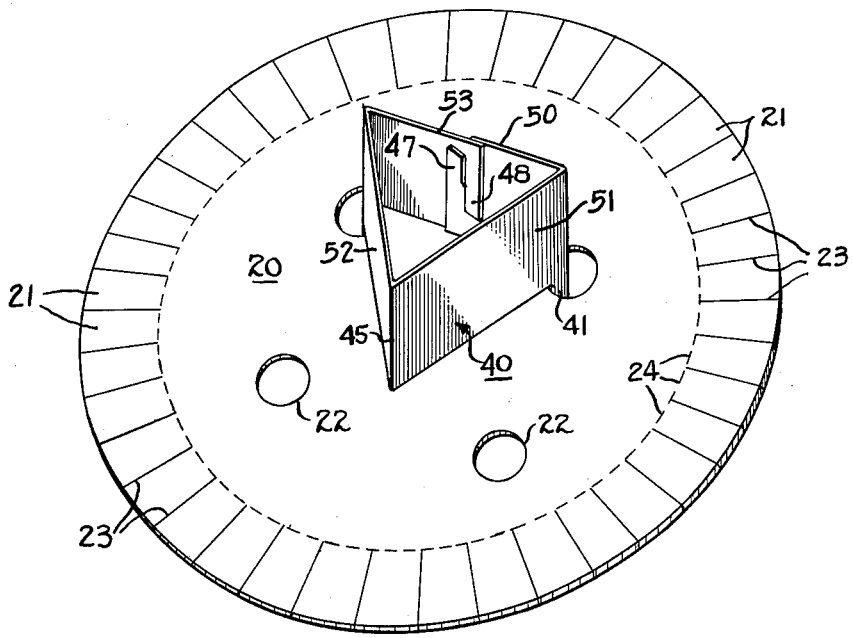
Figure 3:
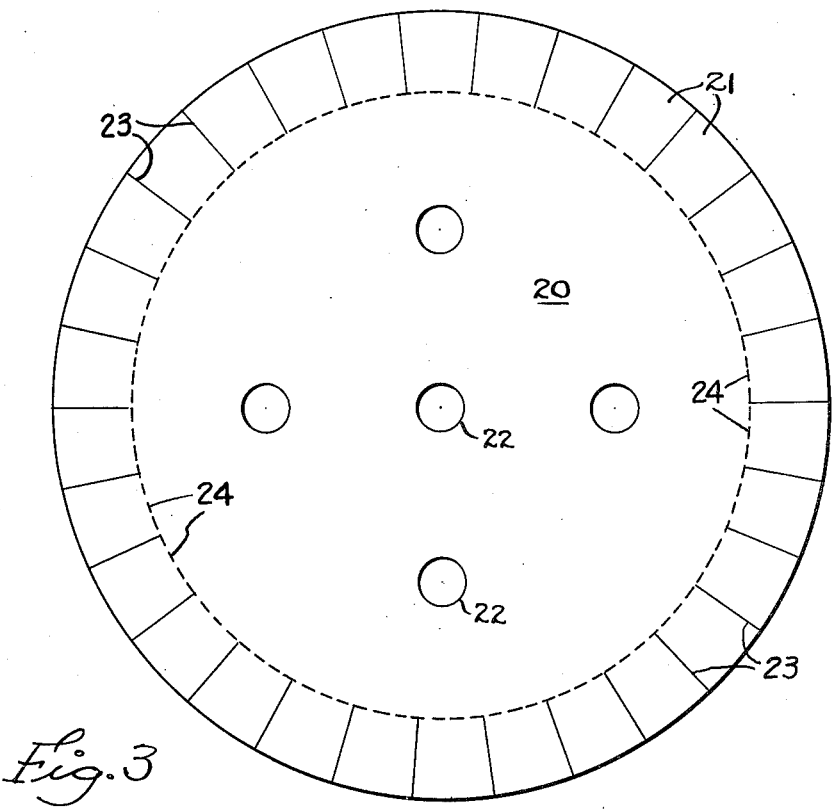
Figure 2:
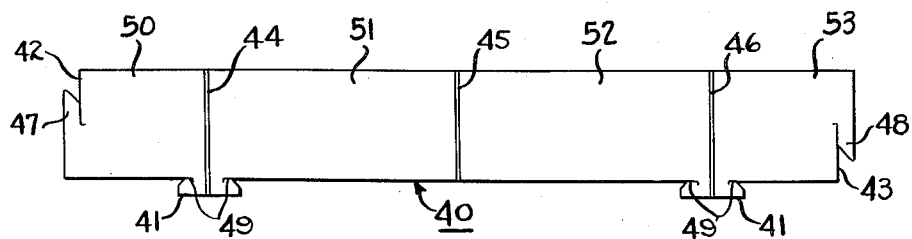

An illustrative embodiment of the invention is shown in the accompanying drawings, wherein:

FIGURE 1 is a cut away view of an assembled fruit package provided internally at the top with a spacer and divider, FIGURE 2 is a plan view of a blank for forming the spacer, FIGURE 3 is a plan view of a blank for forming the divider, and FIGURE 4 is a perspective view of the assembled spacer and divider.

Referring to the drawings, FIGURE 1 shows a cylindrical leak-proof container 10 having a tightly fitting circular closure 11 and containing a liquid packing medium 101 the level of which is indicated by numeral 102. The food, such as cherries indicated by numeral 100, is held down below the surface of the liquid by a divider 20. The divider 20 is made from a circular blank of suitable flexible material such as waxed paperboard. The blank is provided with a plurality of cut lines 23 extending radially inwardly from the outer perimeter to provide a plurality of successive flanges each of which is hinged along an inner circular score line 24. The blank is also provided with a plurality of spaced holes 22 of suitable dimension for a purpose to be discussed later.

The size of the blank and location of the circular hinge line 24 is predetermined so that when the divider is inserted at the circular top of cylindrical container 10 the flanges 21 will be folded upwardly as shown in FIGURE 1. The length of flanges 21 may be approximately equal to or slightly greater than the height of the spacer 40 or, as shown, slightly less. Hence, when the spacer is inserted, the ends of the flanges and the upper edge of the spacer will be in contact with the underside of the closure of the container. Flanges 21 at the circumference of divider 20 provide a close, frictional contact against the side of container 10 thereby helping to maintain the position of the divider in approximately a horizontal plane.

A separate detachable spacer element is suitably attached to the divider 20, as shown in FIGURE 4, in order to depress the divider 20 below the liquid level 102. The spacer is made from a blank of suitable flexible material, such as waxed paperboard, and as shown in FIGURE 2, is suitably cut and scored along spaced lines 44, 45 and 46 to provide hinged panels 50—53, legs 41 and slots 49. Panel 50 is provided with a locking tab 47 and panel 53 is provided with a locking tab 48. The height of the panels is predetermined so that when the spacer 40 is positioned on the divider 20 at the top of the container 10, the spacer will depress the divider below the liquid level 102. The blank is adapted to be folded along lines 44, 45 and 46 into a triangular contour as shown in FIGURE 4. Locking tabs 47 and 48 are positioned on the inside of the folded triangle with edges 42 and 43 in essentially a common vertical line when the triangle is locked in erected position as shown in FIGURE 4. Legs 41 are cut back at 49 to provide slots which engage divider 20 after insertion in the holes 22 in the divider.

The holes 22 in the divider 20 serve the dual function of allowing the liquid medium to readily pass through the divider as the container is filled with syrup and also to engage legs 41 of the spacer 40 as shown in FIGURE 4. This engagement prevents movement of the spacer relative to the divider during filling and in the finished food package. When the liquid packing medium is poured into the area encompassed by the spacer 40 in folded position as shown in FIGURE 4, the sides of the spacer will prevent splashing.

The time at which the spacer and divider are positioned in the receptacle 10 during the packaging of the food depends on the viscosity of the medium employed. When using heavy syrup, usually about two thirds of the syrup is poured into the container before the divider and spacer are inserted because the heavy syrup does not readily pass through the holes in the divider. When a thin liquid medium is employed, the main limitation on speed of filling the container is splashing, which can be reduced by the use of the spacer and divider, and therefore operating efficiency can be increased by using the present invention even during initial pouring of the liquid.

The divider and spacer preferably are made of solid bleached sulfite paperboard from about .0022 inch to about .026 inch and is provided with a gloss wax composition coating or other suitable materials, such as polyethylene, rubber hydrochloride and the like. Other sheet materials such as plastic sheets and metal foil may be used. Selection of the exact material to be employed will be influenced by economic consideration as to price of the material, the properties of the material and the food to be packaged.

The size of the holes in the divider will depend upon the size of the food commodity that is packed. In the case of frozen fruit which is substantially of uniform size, the holes will be slightly smaller than the smallest pieces of fruit to prevent passage of the fruit through the holes to the area above the divider.

The container may be cylindrical or rectangular in contour and made of metal or other suitable material that is leak-prof with respect to the liquid packing medium. The divider obviously should have the same contour as the cross-sectional contour of the container and be of suitable dimensions as explained previously.

The present invention has utility not only in the frozen fruit industry but also in the packaging of other foods such as pickles wherein there is a tendency for the food to rise to the top of the packing medium. It will thus be apparent that the details of construction of the spacer and divider, which together constitute the spacing element or food depressor, may be modified without departing from the principles of this invention.

I claim:

1. A food depressor, for use in a liquid containing food package, comprising a circular semi-rigid divider, said divider having a plurality of holes therein, and a vertically extending spacer of polygonal horizontal cross-section having a plurality of connecting legs extending from the lower edge thereof, said connecting legs being provided with locking slits, said spacer being connectively attached to the upper surface of the divider centrally of the divider by engagement of said locking slits with the adjacent inner portion of said holes.

2. A food depressor, for use in a food package, comprising a circular paperboard divider having flanges hingedly connected at its circumference, said divider having a plurality of holes therein, and a spacer formed by three hingedly connected vertically extending walls and of triangular horizontal cross-section, said spacer having connecting legs extending from its lower edge adjacent each corner, said legs being provided with locking slits, said spacer being connectively attached to the upper surface of the divider centrally of the divider by engagement of said locking slits with the adjacent inner portion of said holes to prevent relative movement of the spacer with respect to the divider.

3. The food depressor of claim 2 wherein the horizontal cross-sectional area encompassed by said spacer is relatively small in comparison to the area of the divider and the spacer has a vertical height to substantially eliminate splashing when a liquid medium is poured within the area enclosed by the spacer.

References Cited in the file of this patent

UNITED STATES PATENTS

| | | |
|---|---|---|
| 900,740 | Keeley | Oct. 13, 1908 |
| 1,084,114 | Scheier | Jan. 13, 1914 |
| 1,654,914 | Beery | Jan. 3, 1928 |
| 2,489,616 | Buttery | Nov. 29, 1949 |